US010955110B2

(12) United States Patent
Zozgornik et al.

(10) Patent No.: US 10,955,110 B2
(45) Date of Patent: Mar. 23, 2021

(54) PRECOLLIMATOR FOR A LIGHTING DEVICE

(71) Applicant: Lumileds Holding B.V., Schiphol (NL)

(72) Inventors: Steffen Zozgornik, Leverkusen (DE); Ulrich Hechtfischer, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/709,110

(22) Filed: Dec. 10, 2019

(65) Prior Publication Data
US 2020/0191356 A1 Jun. 18, 2020

(30) Foreign Application Priority Data
Dec. 13, 2018 (EP) .................... 18212276

(51) Int. Cl.
*F21V 5/04* (2006.01)
*G02B 27/30* (2006.01)
*F21V 5/00* (2018.01)
*F21S 41/25* (2018.01)
*F21S 41/143* (2018.01)
(Continued)

(52) U.S. Cl.
CPC .............. *F21V 5/04* (2013.01); *F21S 41/143* (2018.01); *F21S 41/151* (2018.01); *F21S 41/25* (2018.01); *G02B 27/30* (2013.01); *F21V 5/007* (2013.01); *F21V 5/008* (2013.01); *F21V 7/0091* (2013.01); *F21Y 2115/10* (2016.08)

(58) Field of Classification Search
CPC . F21V 5/04; F21S 41/25; F21S 41/143; F21S 41/151; G02B 27/30
See application file for complete search history.

(56) References Cited

U.S. PATENT DOCUMENTS

| 2012/0033441 | A1  | 2/2012 | Sousek et al. |
| 2016/0139316 | A1* | 5/2016 | Speier ................. G02B 6/0023 362/607 |
| 2020/0149706 | A1* | 5/2020 | Khosla ................ F21V 7/043 |

FOREIGN PATENT DOCUMENTS

| DE | 102011088702 A1 | 6/2013 |
| DE | 102017204097 A1 | 9/2018 |
(Continued)

OTHER PUBLICATIONS

Gromfeld, Yves, "A Compact Light-Emitting Module, and Projector Device Associated fro Motor Vehicle", Oct. 13, 2017, FR3050010, EPO, pp. 1-12.*

(Continued)

*Primary Examiner* — Alan B Cariaso

(57) ABSTRACT

The disclosure describes a precollimator for a lighting device, including:
a) a number of first collimator units each having an entry face and an exit plane, wherein for each first collimator unit
 the exit plane is wider than the entry face in a first direction and
 the entry face and the exit plane have the same width in a second direction that is perpendicular to the first direction and
b) a second collimator unit having an entry plane and an exit face, wherein the exit face is wider than the entry plane in the second direction, and
wherein the exit plane of each first collimator unit is optically connected to the entry plane of the second collimator unit, wherein the precollimator is joined together from at least two components.
The disclosure further describes such lighting device and a method to manufacture such precollimator.

16 Claims, 6 Drawing Sheets

(51) Int. Cl.
*F21S 41/151* (2018.01)
*F21Y 115/10* (2016.01)
*F21V 7/00* (2006.01)

(56) References Cited

FOREIGN PATENT DOCUMENTS

| | | |
|---|---|---|
| EP | 1895228 A1 | 3/2008 |
| EP | 3179157 A1 | 6/2017 |
| FR | 3050010 A1 | 10/2017 |

OTHER PUBLICATIONS

Giraud et al., "Transparent Optical Element having Deflecting Facets for Image Doublication", Jun. 14, 2017, EP3179157A1, pp. 1-27.*
EP 18212276.2, "Extended EP Search Report and Written Opinion," dated Jun. 21, 2019, 9 pages.
Notification from the EPO as the ISA, International Search Report and Written Opinion, PCT/EP2019/083688, dated Feb. 26, 2020, 13 pages.

* cited by examiner

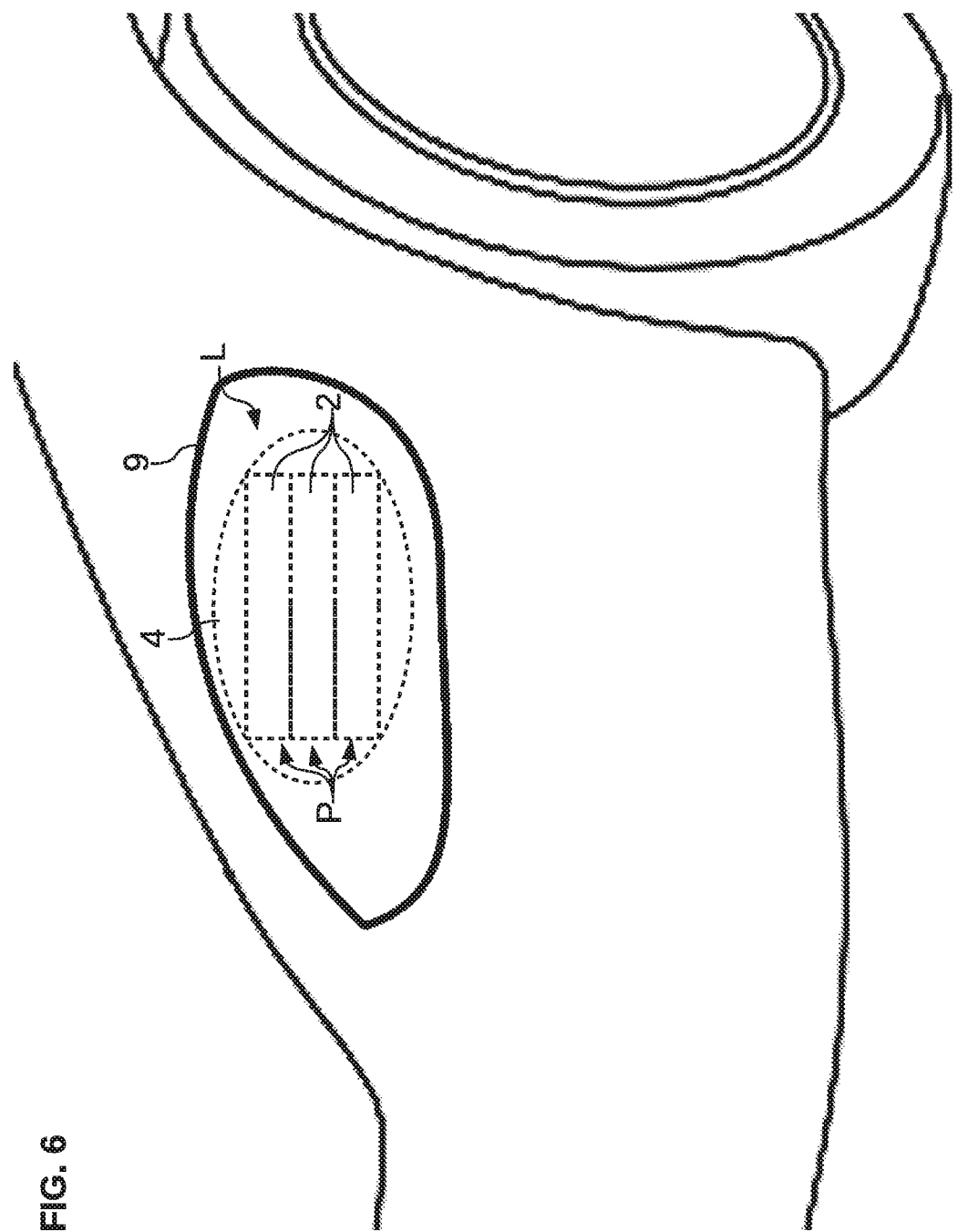

PRECOLLIMATOR FOR A LIGHTING DEVICE

CROSS REFERENCE TO RELATED APPLICATIONS

This application claims priority to European Patent Application No. 18212276.2 filed on Dec. 13, 2018, and titled "PRECOLLIMATOR FOR A LIGHTING DEVICE," which is incorporated herein by reference.

FIELD OF THE INVENTION

The invention describes a precollimator for a lighting device, especially for an LED lighting device, such lighting device and a method for producing a precollimator. The precollimator is especially a dimension-separated two-stage modular precollimator.

BACKGROUND OF THE INVENTION

For some time now, more and more "LED matrix" systems have come on the market in which the light from individual high-power LEDs is optically directed into different angular sections of the final beam. These systems are used to improve the performance of LED-based automotive headlighting.

By switching or dimming an LED, the respective segment of the beam can be controlled so that a very flexible total beam pattern is possible, to e.g. de-glare oncoming traffic or to highlight obstacles. An LED matrix system consists of a number of LEDs e.g. soldered to a printed-circuit board (PCB). The light from the LEDs is then collected by optics and directed to the road. However, as LEDs normally radiate Lambertian into the full half-space, it is difficult to collect and use all light. Therefore, many matrix systems use primary optics (also called "pre-optics") close to the LED to pre-collimate the light, so that a larger fraction of the light is collected by the final (secondary) optics. In most cases, the pre-optics are light guides. Since a primary optic is used to pre-collimate the light it is called "precollimator" in the following. In the following, a light guide uses the principle of total internal reflection ("TR").

Most existing systems use complicated light-guide bundles made of optical silicone (liquid silicone rubber). Silicone has many advantages for this technical use. It resists the high temperatures of 150° C. near the LEDs without aging or browning and it can be injection-moulded into very fine and complex shapes because it has a low viscosity in the mould and can be bent during the extraction from the mould.

However, the moulds are very expensive, a typical mould costs up to about 500,000 € per tool, which raises cost per unit unless the quantity is very high. The light-guide bundles have to be tailor-made for every new matrix module because they depend e.g. on the number and position of LEDs, the desired light distribution etc. For every new matrix module type setup another tool is needed.

Therefore, it is an object of the invention to provide an improved precollimator for a (LED) lighting device that overcomes or at least alleviates the problems described above.

SUMMARY OF THE INVENTION

This object is achieved by the precollimator of claim 1, the lighting device of claim 12, and the method of claim 14 for producing a precollimator.

It should be noted, that although the invention is especially advantageous for LED lighting devices, it is also applicable for all other sorts of lighting devices. Generally, the invention can work with all sorts of light sources, however, in the following, some embodiments are explained on the basis of LED lighting devices since the use of LEDs as light sources is preferred. The term "LED" includes all possible semiconducting light sources. However, inorganic and organic light emitting diodes ("OLED's") are most common and most preferred for the invention. In addition, laser-based light sources are also preferred.

The precollimator according to the invention is suited for a lighting device and comprises the following components:

a) A number of first collimator units each having an entry face and an exit plane, wherein, for each first collimator unit, the exit plane is wider than the entry face in a first direction and the entry face and the exit plane have essentially the same width in a second direction that is perpendicular to the first direction.

b) A second collimator unit having an entry plane and an exit face, wherein the exit face is wider than the entry plane in the second direction.

Concerning the precollimator, the exit plane of each first collimator unit is optically connected to the entry plane of the second collimator unit, wherein the precollimator is joined together from at least two components. In addition to the optical connection, a mechanical connection, e.g. by gluing or welding, is preferred due to a good internal coherence of the components. As explained in the following, a number of first collimator units and a part of the second collimation unit could even be realized as one single piece, e.g. concerning the embodiment with a junction element described in the following.

The expression "optically connected" means that light rays pass directly from a first collimator unit to the second collimator unit. There should be no gap between the first collimator unit and the second collimator unit. Preferably, the first collimator unit touches the second collimator unit (wherein there could be a thin layer of glue or an optically connecting medium like silicone rubber, an optical grease or oil between these two parts enhancing the optical contact). Alternatively, the first collimator unit and parts of the second collimator unit could be formed as one integral part, wherein the optical connection is naturally given. It is preferred that there is a mechanical connection between the first collimator unit and the second collimator unit to provide a good and permanent optical connection.

It should be noted that instead of the terms "exit plane" and "entry plane" the terms "exit face" or "entry face", respectively, could also be used. For the sake of clarity, the term "plane" is used in the expressions "exit plane" of the first collimator units and "entry plane" of the second collimator unit, since in some embodiments described below these planes could be "internal faces" in a piece of material combining first collimator units with parts of the second collimator unit. One could say that "plane" means a face independent from the fact that it is an (outer) surface of a geometrical body or an internal face inside a piece of material formed from two or more geometrical bodies. At least in the case in which the first collimator units and the second collimator unit are separate pieces of material (that are perhaps glued or welded together), the term "entry plane" could be replaced by "entry face" and the term "exit plane" could be replaced by "exit face".

One advantage of this precollimator is that it has the same function as a known precollimator but is designed such that it is easier and cheaper to produce and that it can possibly be used in a modular way.

Generally, there could be only one first collimator unit, however, a preferred setup comprises two or more first collimator units that are connected to one single second collimator unit. For the sake of a better understanding of the setup, the directions and special shapes are explained in the following.

The first direction and second direction are perpendicular to each other and span a plane in space. A third direction or "axis" could be defined perpendicular to this plane (i.e. to the first direction as well as to the second direction). This third direction would typically describe a length of the precollimator. The directions can be best understood with the help of a three dimensional coordinate system with three axes being perpendicular to each other. The z-axis (third direction) is parallel to the length of the precollimator and characterizes the direction where light passes straight through the precollimator. The x-axis (first direction) and y-axis (second direction) are on a plane perpendicular to the z-axis. Typically, this plane is parallel to the entry faces and exit faces, or the entry planes and exit planes, respectively of the precollimator.

For a better understanding one could imagine the x-axis as a horizontal axis and the y-axis as a vertical axis. In this picture, the first collimator unit could be called "H-collimator unit", since it collimates in the horizontal direction (first direction or x-axis) and the second collimator unit could be called "V-collimator unit", since it collimates in the vertical direction (second direction or y-axis). The collimation is achieved due to the different width of the entry faces (or planes) and exit faces (or planes). The exit planes of the H collimator units (first collimator units) have the same height as the entry faces (since the entry face and the exit plane have essentially the same width in the second direction which is the vertical direction) but the exit planes of the H collimator units are wider than the entry faces in the horizontal direction (since the first collimator unit is wider than the entry face in the first direction). The V collimator unit collimates in the vertical direction since the exit face is wider than the entry plane in the second (vertical) direction.

As a three-dimensional geometric shape, the collimator units comprise edges and faces, wherein the faces meeting the edges of the entry face and exit face (exit plane) are called "side faces". Thus, the side faces lie between the exit face (exit plane) and the entry face and are considered as the sides of the collimator unit. A collimator unit preferably has the shape of an extrusion body. The first collimator unit preferably has two parallel side faces in the x-z-plane in above coordinate system (first direction and third direction). Thus, this preferred first collimator unit has the shape of a general cylinder, in particular a right general cylinder, especially the shape of a prism. The second collimator unit can have two parallel side faces, however, they could also be inclined. Thus this preferred second collimator unit could also have the shape of a general cylinder, in particular a right general cylinder, especially the shape of a prism or the shape of a frustrum. In a preferred embodiment, a collimator unit can have curved faces. For example, the entry face and the exit face are planar faces and at least one side face can be curved, or the entry face of the first collimator unit and the exit face of the second collimator unit can be curved. It should be noted that a collimator unit having the shape of an extrusion body simplifies the production of this collimator unit, since it can be cut out of a slab of transparent material (especially the first collimator unit) or extruded in a very simple manner.

The function of the precollimator is explained in the following:

Light that is emitted in the direction of the z-axis is normally not collimated since it does not meet the side faces of the collimator units. It passes straight through the precollimator. However, an LED emitting in the direction of the z-axis also emits light propagating inclined to the z-axis due to the Lambertian emission of the LED. Light rays with a component in the direction of the x-axis meeting a side face of the first collimating unit are collimated (provided that the conditions for total inner reflection are met). Light rays with a component in direction of the y-axis meeting a side face of the first collimating unit are not collimated since the first collimator unit acts in this direction as a simple light guide due to its shape. The second collimator unit "sees" at its entry face the exit planes of the first collimator units as illuminated pixels. Due to the shape of the second collimator unit, light rays with a component in the direction of the y-axis meeting a side face of the second collimating unit are then collimated (provided that the conditions for total inner reflection are met).

Thus, the collimation is achieved in two steps: first, there is a collimation in the first direction (e.g. the horizontal direction) and after that, there is a collimation in the second direction (e.g. the vertical direction). There is a slight drawback since propagation distance is "wasted" by not collimating light, e.g. the second direction concerning the first collimator unit, however, this drawback is overbalanced by the great advantage of the simple and modular setup of the precollimator.

A lighting device according to the invention comprises a precollimator according to the invention and a number of light sources, preferably LEDs, wherein each light source is arranged to emit light into the entry face of a first collimator unit. The (LED) lighting device of the invention is preferably designed as an adaptive directional lighting device.

A (directional) lighting device according to the invention is preferably designed for the technical field of automotive, e.g. as a frontlighting device. The (directional) lighting device is preferably designed as a high beam directional lighting device, preferably as a headlight. The expression "directional lighting device" should be interpreted as a lamp or lighting unit, wherein a light is cast in a main direction e.g. such as from the front of a vehicle into the driving direction of the vehicle. Examples for a (directional) lighting device are headlights, spotlights or searchlights.

A method according to the invention for producing a precollimator according to the invention comprises the following steps:

producing or providing the number of the first collimator units each having its entry face and its exit plane, wherein for each first collimator unit, the exit plane is wider than the entry face in the first direction and the entry face and the exit plane have essentially the same width in the second direction that is perpendicular to the first direction, producing or providing the second collimator unit, wherein the exit face of this second collimator unit is wider than its entry plane in the second direction. Alternatively, the step could include producing or providing a collimating section, at least in the case in which the second collimating unit comprises the above mentioned junction unit and the collimating section, optically joining the components, i.e. the first and second collimator units or the first and second collimator units with the collimating section(s), wherein the exit plane of each first collimator unit is optically connected to the entry plane of the second collimator unit.

It should be noted that the collimator units could be formed from segments that are later assembled to form the respective individual collimator unit. Thus, it is definitely possible that the first collimator units are formed as one piece of material that comprises parts of the second collimator unit (see e.g. the junction element described in the following). In other words, it is not necessary that the exit plane of a first precollimator unit and the entry plane (entry face) of the second collimator unit are surfaces that are glued or welded together (then they are preferably referred to as "faces" instead of "planes"). It is also possible that the exit plane of a first collimator unit and the entry plane of the second collimator unit are theoretical planes separating a shape collimating only in the first direction and a shape collimating in the second direction.

Nevertheless, due to the object of the invention, it is particularly preferred that the piece comprising a first collimator unit and a part of the second collimator unit has no collimating properties in the second direction, or in other words: this piece should have a constant width in the second direction. For example, it could be cut from a planar plate.

The second collimator unit is preferably formed by extrusion forming or press forming of a strand, wherein the entry face (or a groove) and the exit face are arranged parallel to the length of the strand. Thus, by looking at the cross-section area of the strand one looks at the side of the second collimator unit.

The preferred material for the strand is obviously transparent. The material is preferably selected from the group comprising glass, plastic, and silicone (polysiloxane). Since the second collimator unit is positioned further from the (hot) light sources, it can be made from a material that is less temperature-resistant than silicone, but simpler to manufacture and process, preferably polycarbonate (PC).

Thus, in accordance with this method, a preferred first collimator unit is produced by cutting or otherwise constructing the shape from a planar plate and/or a preferred second collimator unit is produced by extrusion forming or press forming and/or separation from a strand by cutting.

The dependent claims and the following description disclose particularly advantageous embodiments and features of the invention. Features of the embodiments may be combined as appropriate. Features described in the context of one claim category can apply equally to another claim category.

According to a preferred precollimator, the exit face and the entry plane of the second collimator unit have the same width in the first direction, wherein two opposite side faces of the second collimator unit are preferably parallel to each other and arranged perpendicular to the first direction. Thus, in this embodiment the second collimator unit has no collimating properties in the first direction, but in the second direction only.

According to a preferred precollimator, two opposite side faces of the first collimator unit are parallel to each other and arranged perpendicular to the second direction. In the above picture, where the second direction is the vertical direction, said side faces are the upper and lower side faces both arranged horizontally. Such first collimation unit has the shape of a geometric extrusion body where an area in the x-z-plane (see above coordinate system) is extruded along the y-axis. This first collimation unit can easily be cut from a planar plate of transparent material. For the sake of clarity it should be noted that concerning the term "extrusion body" a CAD-application could be imagined, where a planar shape in one plane in space could be extruded along a trajectory to create a three dimensional body. Concerning the invention, this trajectory is a straight line perpendicular to the plane of the shape. On the other hand, the term "extrusion" could also be used to name a production process. An extrusion body could also be produced by such extrusion process. However, the cutting of the first collimator units from a planar slab of material is particularly preferred, since it results in optically advantageous suitable pieces while using an easy production process.

According to a preferred precollimator, the first collimator units comprise, preferably consist of, silicone sheet or glass and are preferably cut out of a transparent plate of material.

According to a preferred precollimator, the exit planes of at least two first collimator units have different dimensions, wherein preferably the widths of the exit planes in the first direction are different and the dimensions in the second direction are particularly preferably the same. This embodiment has the advantage that pixels of different width can be aligned on one second collimator unit.

According to a preferred precollimator, the surface of the exit-face of the second collimator unit is provided with a texture or an optical structure. A preferred surface comprises a roughening, an (especially holographic) light scattering device or a (preferably lenticular) lens array. In particular, the lens array is designed to optically move the exit face of the second collimator unit in the direction of the entry plane of the second collimator unit, preferably to the position of the entry plane of the second collimator unit. The lenses are preferably cylindrical lenses arranged along the first direction. However, the lens array could be applied as an additional element, e.g. as a sheet, on the exit face of the second collimator unit. The roughening has the advantage that minimal gaps between the images of LEDs are blurred and, therefore, no sharp intensity-transitions can be registered there.

Especially the lens structure of the exit face of the second collimator unit compensates the different exit planes of the first collimator units and the second collimator unit since, as said above, this lens structure is able to move the apparent exit face back into the collimator, so that it becomes identical to the exit plane of the first collimator units.

According to a preferred precollimator, the first collimator units are arranged (preferably linearly) in the first direction, wherein the exit planes of two or more, preferably essentially all, first collimator units are preferably optically connected to a transparent junction element, preferably made of the same material as the first collimator units. As mentioned above, this junction element is (conceptually) part of the second collimator unit and comprises the entry plane of the second collimator unit, although the first collimator units and the junction element could be manufactured as one piece of material. This embodiment has the advantage that the first collimator units are not glued to the entry face of the second collimator unit, but arranged in a very stable way. For forming the second collimator unit, the junction element could be arranged in a groove of a specially shaped piece of material that represents the other part of the second collimator unit.

In a preferred embodiment, the first collimator units and the junction element are manufactured as said one piece of material, in particular cut out of a transparent plate of material. It should be noted that due to the purpose of the invention, the junction element should have the shape of a planar plate. At least the exit face of the junction element should have the same dimension as its entry plane in the second direction (i.e. the same height in the above picture). The entry plane (or entry face, respectively) should have at least the same dimension as the sum of the widths of the exit planes of the first collimator units in the second direction.

According to a preferred precollimator, the second collimator unit comprises the junction element and a collimating segment optically connected (and preferably mechanically connected) to the junction element. Since the junction element typically does not comprise collimating properties due to its shape, the collimating segment adds these collimating properties to the second collimator unit. To reduce disturbing optical effects, the junction element and the collimating segment should provide essentially equal refraction indices and be optically joined to one another.

It is preferred that the collimating segment comprises a groove designed such that the junction element fits in that groove and forms a locking fit. The junction element should fit like a tongue in this groove.

Alternatively or additionally, it is preferred that the collimating segment is arranged on the junction element in the second direction. The junction element could range from the entry plane of the second collimator unit to its exit face. In this case, the collimating segment should be arranged on and/or under the junction element flush fitting with the exit face (and also the entry plane) of the second collimator unit. The collimating segments could, for example, be triangular prisms with one leg of the triangle reaching from the entry plane to the exit face of the second collimator unit.

Since, due to optical reasons, the precollimator can be mounted only at very few points, the junction between first collimator units and second collimator unit should be mechanically robust. To simplify the junction, a piece comprising the first collimator unit could continue into the second collimator (e.g. on account of above described junction element). For example, the remaining part of the second collimator unit (the collimating section) could be moulded around that junction element or glued (see above solution with tongue and groove). As long as both materials have a sufficiently close index of refraction, the second collimator unit will still behave as if it were made of a single part.

According to a preferred precollimator, the first collimator units, preferably together with a junction element, have the shape of a geometrical extrusion body of an area extruded along the second direction and wherein the second collimator unit has preferably the shape of a geometrical extrusion body of an area extruded along the first direction.

The first collimator unit should be made from a suitable flat material such as a silicone sheet or glass. Care should be taken concerning cutting the edges, because any roughness of the edges will spoil the total internal reflection (TIR) and thus the light-guide function. One example for manufacture is the smooth cutting of glass.

According to a preferred precollimator, the second collimator unit and/or the first collimator units and/or the junction element are made of optical glass, wherein the connection between the second collimator unit with the exit planes of the first collimator units or with the junction element is preferably achieved by heat fusion (also referred to as "butt fusion"). Glass has the advantage that the entry faces of the first collimator units could be brought into mechanical contact with the light sources, without risking optical contact due to thermal issues.

According to a preferred precollimator, the second collimator unit is at least in the region of its entry plane (essentially at the position of the entry plane or with a small distance from the entry plane, e.g. less than 20 mm) wider than the sum of the widths of the exit planes of the first collimator units in the first direction, wherein the additional width is preferably designed for mounting the precollimator. Concerning an embodiment with a junction element, the junction element is preferably at least in the region of its entry face wider than the sum of the widths of the exit planes of the first collimator units in the first direction.

As said above, the whole precollimator can be mounted only at very few points, in order not to disturb the TIR. One mounting point could be the entry faces of the first collimator units near the LED, the other one near the exit face of the second collimator unit. This embodiment allows an advantageous mounting at a third position that lies near the intersection between the first collimator units and the second collimator unit.

A preferred lighting device comprises a projection optic, e.g. a lens. The projection optic is preferably arranged to image the light into the farfield e.g. in a headlight.

The projection optic is preferably designed such that it has different focal planes in the first direction and second direction, wherein the projection optic is designed and arranged such that the focal plane in the first direction lies at the position of the entry plane of the second collimator unit (exactly at the entry plane or at maximum 5 mm distant from the entry plane) and the focal plane in the second direction lies at the position of the exit face of the second collimator unit (exactly at the exit face or at maximum 5 mm distant from the exit face). This has the advantage that this facilitates a projection of a horizontally and vertically sharp pixel by the projection optic although the exit planes of the different collimator units do not coincide; or, expressed alternatively, having the projection optics' focal plane in the first direction at the position of the entry plane of the second collimator unit avoids smearing of the pixels in the first direction which, otherwise (i.e., with such focal plane at the second collimator's exit face), would take place by the light propagation through the second collimator unit.

A projection optic comprising a first focal plane and a second focal plane could e.g. be realized with a projection optic comprising two refractive powers at orientations perpendicular to each other.

A focal plane is, in the following, preferably assumed being flat, i.e., not curved. In a practical case, where the focal plane is usually curved (curvature of field) and the faces of the second collimator unit are usually flat, a balance could be found according to the following method. First, a flat (theoretical) focal plane is arranged in a desired (theoretical) position. Then the projection optic is positioned such that (seen from this projection optic) the (real) focal plane runs behind the (theoretical) focal plane at the middle of the face and in front of the (theoretical) focal plane at the sides of the face. It is particularly preferred that the (real) focal plane crosses the (theoretical) focal plane at two points at about a quarter and three quarters of the length of the face, or that the integrated areas behind and in front of the (theoretical) focal plane are essentially equal. According to another preferred embodiment, the (real) focal plane touches the (theoretical) focal plane at a point in the middle of the face. As said above, in the following the flat (theoretical) focal plane is preferably meant, at least if the entry face or the exit face (or the entry plane or exit plane, respectively) are flat.

Since the precollimator material has a certain refractive index, the light emitted from the light sources is refracted by the precollimator. Due to this effect, a focal plane of the projection optic is moved from its theoretical position by the precollimator. One can say that the precollimator shifts the position of the focal plane. Thus, all references to the position of the focal plane must be understood taking the refraction of the pre-collimator into consideration. One can also say instead of the expression "the focal plane of the projection optic", that the "focal plane of the system projection optic and precollimator" or the "focal plane of the illumination device" is regarded. Thus, the projection optic should always be arranged taking the refractive properties of the precollimator into consideration.

The projection optic can comprise an arrangement of a number of optical elements, preferably selected from the group comprising lenses, prisms, and mirrors. It is preferred that the projection optic comprises only one single lens, since this renders the projection optic easy to handle and cost effective. In an automotive front directional lighting unit the projection optic is usually arranged to image the focal plane to the farfield.

According to a preferred LED lighting device the projection optic comprises an aspherical lens, preferably an astigmatic lens (or a toric lens, respectively). Particularly preferred is a lens with two opposite lens surfaces shaped as cylindrical lenses, wherein the focal lines of the two lens surfaces are arranged perpendicular to each other. Preferably, the curvature of one lens surface has a larger radius than the curvature of the opposite lens surface so that the lens comprises two different focal planes. Furthermore, a convex lens is preferred with different optical power and focal length in two orientations perpendicular to each other so that the lens comprises two different focal planes.

According to a preferred manufacturing method, the first collimator unit and/or the second collimator unit have the shape of a geometric extrusion body. The first collimator units are preferably cut from a plate (with plan parallel faces), and the second collimator unit is produced as an extrusion element.

In a preferred case where the first collimating units are connected with the entry plane of the second collimator unit, it is preferred to mechanically connect the exit planes (or here better: exit faces) of the first collimators with the entry plane (face) of the second collimator unit, e.g. by gluing or welding/fusing.

In an alternative preferred case, wherein the number of first collimator units are cut from the plate in one piece connected to a junction element, a collimating section of the second collimator unit is produced as extrusion element and is optically (and mechanically) joined with the junction element. Here, in the case where the collimating section comprises a groove shaped to insert the junction element, the junction element is inserted into the groove of the collimating section and optically joined with the collimating section.

According to a preferred lighting device the intensity of the light sources and/or groups of light sources may be controlled individually, preferably by dimming or switching. A preferred lighting device provides means to control a number of light sources differently to another number of light sources. A preferred lighting device provides means to connect a control for controlling a number of light sources differently to another number of light sources.

A preferred directional lighting device comprises a setup of precollimators and suitably arranged light sources arranged in a vertical stack, such that the second collimator units are arranged horizontally.

The advantage of this simplified precollimator architecture over a monolithic silicone collimator is that its components are very simple in shape. They are actually 2D profiles that are only extruded in the third dimension. They may thus be simple to make and to combine. For example, the set of plano-parallel first collimator units could be punched out of a silicone sheet with a certain thickness, or laser-cut out of a glass plate, even if it has a complicated shape in the area that is extruded. The second collimator can be an extruded part, made from e.g. polycarbonate. The extra effort, compared to a monolithic silicone solution, is to join the two collimator stages optically, e.g. by gluing, or by fusing.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 5B shows a magnified portion of FIG. 5A;

FIG. 6 shows a perspective view of a preferred directional lighting unit.

In the drawings, like numbers refer to like objects throughout. Objects in the diagrams are not necessarily drawn to scale.

DETAILED DESCRIPTION OF THE EMBODIMENTS

Figure 1:
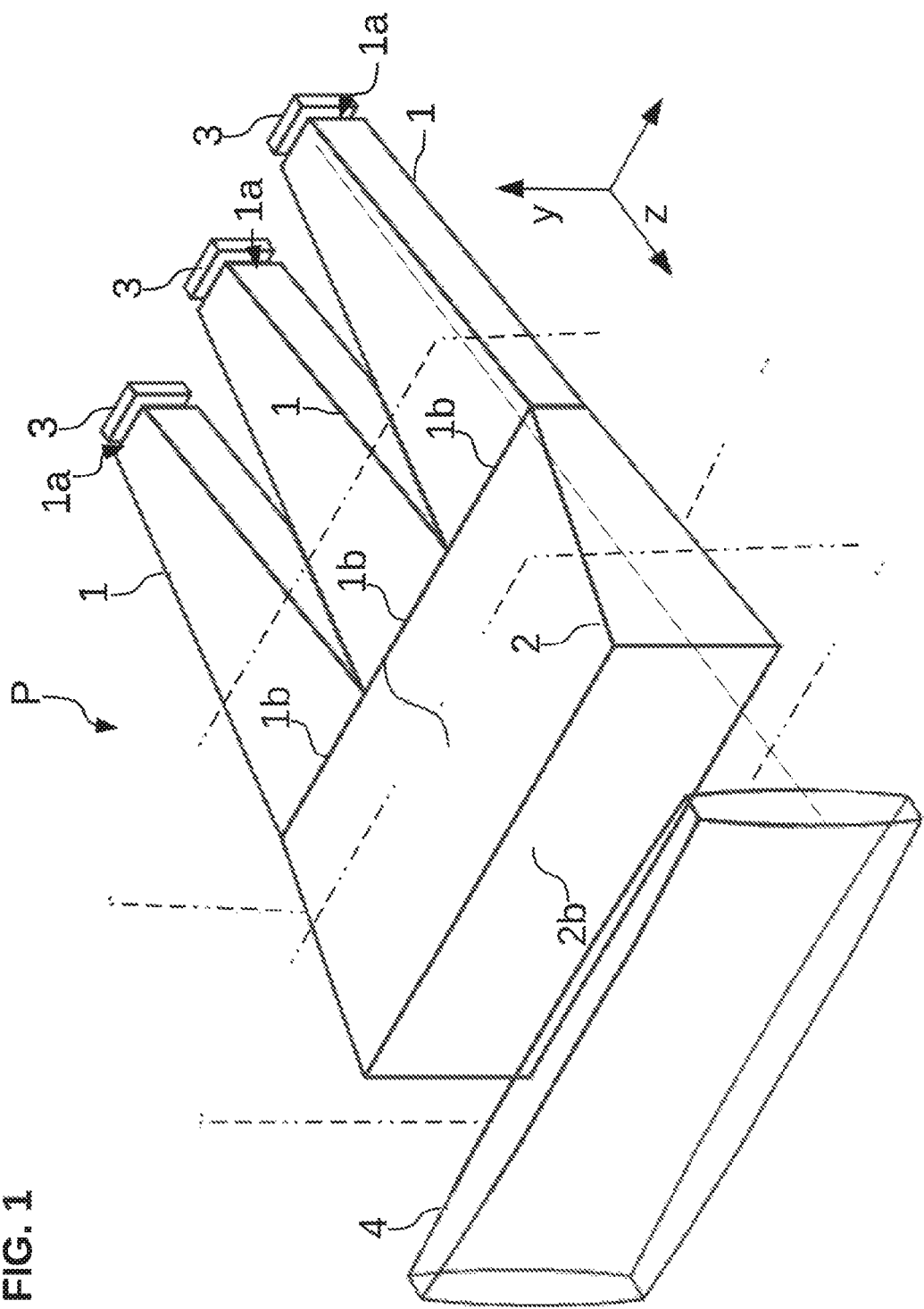
FIG. 1 shows a perspective view of an embodiment of the inventive lighting device.

FIG. 1 shows a perspective view of an embodiment of the inventive lighting device L comprising three light sources 3, e.g. LEDs, a precollimator P according to the invention and a projection optic 4 in form of an astigmatic lens with two focal planes P1 and P2. In reality, the distance of the projection optic 4 to the precollimator P could be much greater than shown in the figure. For example, the precollimator P could have a dimension of 25 mm×30 mm in the x-z-plane and the projection optic could be arranged 50 to 60 mm distant to the precollimator P and could have a diameter of about 40 to 50 mm.

The precollimator P comprises three first collimator units 1. The exit faces 1b of these first collimator units 1 are optically (and here also mechanically) connected to the entry face 2a of the second collimator unit 2.

The entry faces 1a of the first collimator units 1 are as high as the exit faces 1b of the first collimator units 1 in a second direction y (here the direction of the y-axis), but the entry faces 1a are narrower than these exit faces 1b in a first direction x (here the direction of the x-axis) perpendicular to the second direction y.

Figure 2:
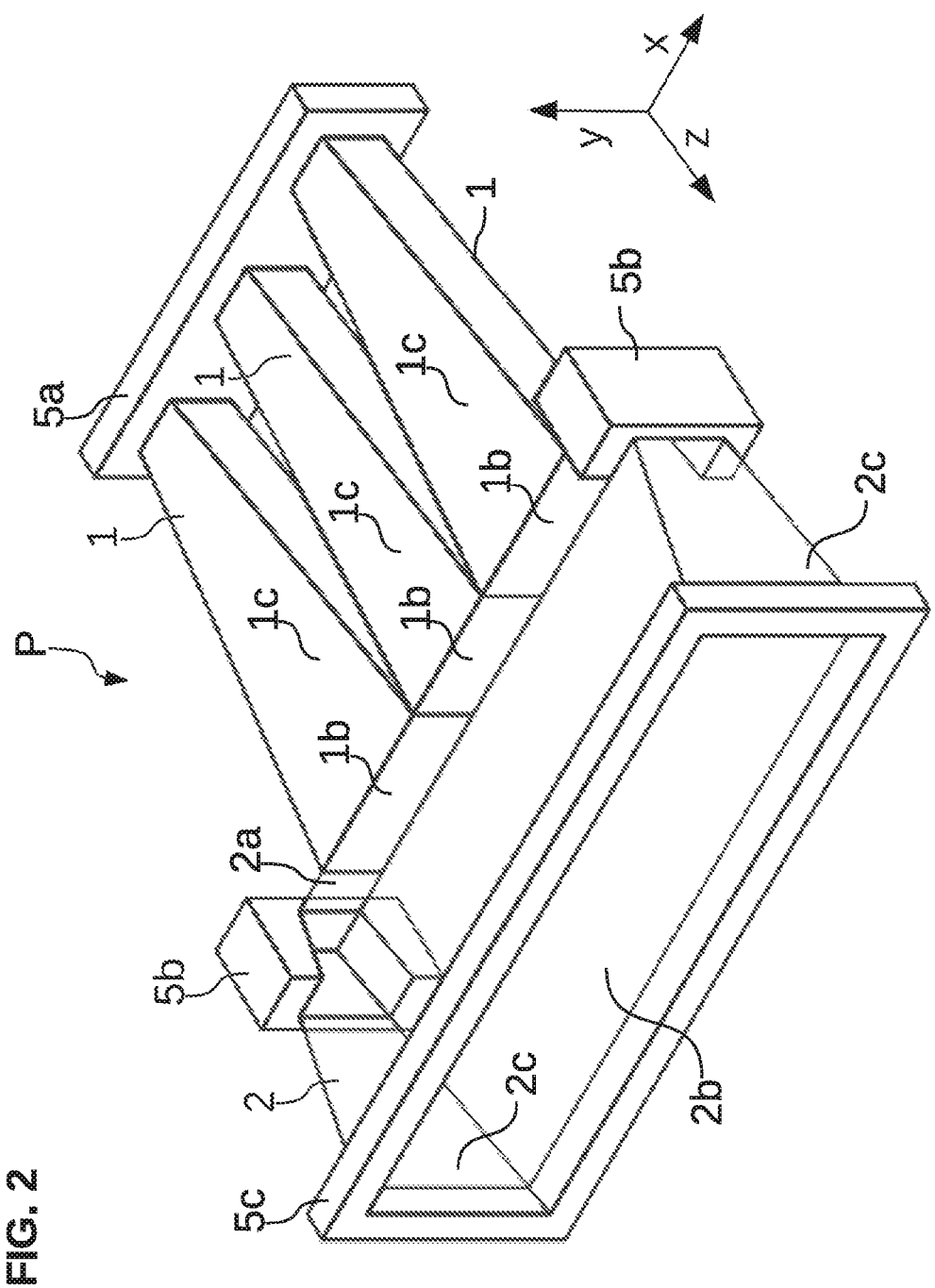
FIG. 2 shows a perspective view of an embodiment of the inventive precollimator.

FIG. 2 shows a perspective view of an embodiment of a precollimator P according to the invention. The shape of the precollimator P is similar to the precollimator P of the lighting device L shown in FIG. 1, however, with some differences. One difference is that here also mounting structures 5a, 5b, 5c are shown for mounting the precollimator P. Another difference between the precollimators P of FIGS. 1 and 2 is that here the exit faces 1b of the first collimator units 1 have different dimensions in the first direction x (along the x-axis): following the x-axis, the first exit face 1b is the widest followed by the smallest exit face 1b again followed by an exit face 1b of intermediate width of the first collimator units 1.

The upper and lower side faces 1c of the first collimator units 1 are parallel to each other so that the first collimator units 1 form geometrical extrusion bodies of the shape of the upper side faces 1c. The first collimator units 1 are mounted in the region of their entry faces 1a (see FIG. 1) with a first mounting structure 5a.

Similar to the upper and lower side faces 1c of the first collimator units 1, the left and right side faces 2c of the second collimator unit 2 are also parallel to each other, however, this is not necessary. Different from FIG. 1, the second collimator unit 2 is wider than the sum of the widths of the exit faces 1b of the three first collimator units 1 in order to apply two mounting structures 5b for mounting the region where there is a contact between the exit faces 1b of the first collimator units 1 with the entry face 2a of the second collimator unit 2. The exit face of the second collimator unit 2 is mounted with the help of a further mounting structure 5c.

In the state of the art, a collimator light guide has typically collimating properties in both the first direction x (here horizontal) and the second direction y (here vertical). The collimation (i.e. a reduction of the numerical aperture) depends on the ratio of the output and input dimensions. It could be seen, due to the shapes of the first collimator units and the second collimator unit, that the collimation is achieved horizontally and vertically in two steps. The first collimator, which is plano-parallel in the second direction y (uniform height) collimates only in the (horizontal) first direction x, narrowing the beam by a factor A(entry)/A(exit), where A(entry) is the area of the entry face 1a and A(exit) is the area of the exit face 1b of the first collimator units 1. Since the three first collimators 1 have different output widths in the first direction x and the same dimension in the second direction y, they collimate horizontally by different amounts and provide, at their output, three "pixels" of different horizontal width. Their shape in the x-z-plane, here simply trapezoids, can be more complex in order to not only collimate, but also to bend the output beam horizontally into a certain direction. Then, the following second collimator unit 2 collimates only in the second direction y, again by a factor of B(entry)/B(exit), wherein here B(entry) is the area of the entry face 2a and B(exit) is the area of the exit face 2b of the second collimator unit.

Figure 3:
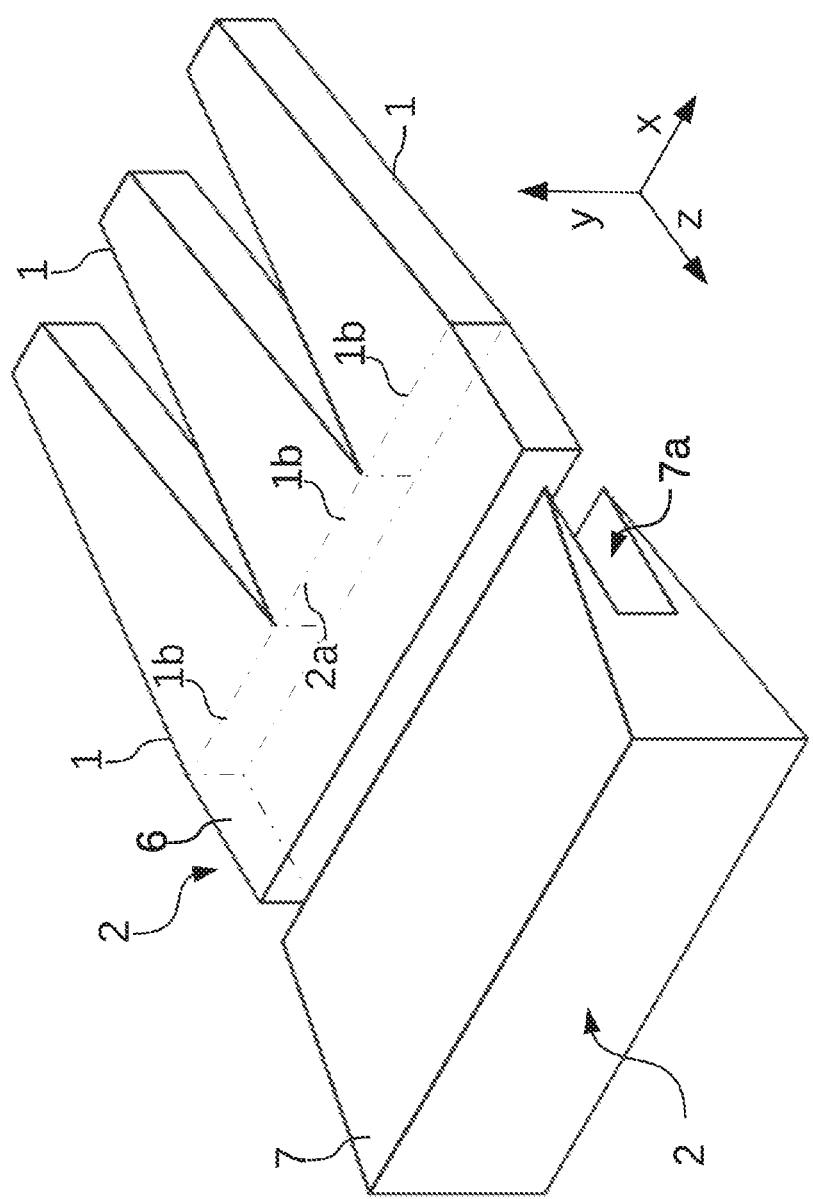
FIG. 3 shows a perspective view of another embodiment of the inventive precollimator.

FIG. 3 shows a perspective view of another embodiment of a precollimator P according to the invention. The shape of the precollimator P is similar to the precollimator P of the lighting device L shown in FIG. 1, with the difference that the first collimator units 1 are assembled in one piece together with a junction element 6.

Since, conceptually, the junction element 6 belongs to the second collimator unit 2, one face of the junction element 6 could be addressed as entry plane 2a of the second collimator unit 2. Although there is no contact region of the exit planes 1b of the first collimator units 1 and the entry plane 2a of the second collimator unit 2, the dash dotted line shows that there could always be assumed a theoretical region where the first collimator units 1 meet the second collimator unit 2, although this body is manufactured as one piece. This piece has the shape of an extrusion body of an area in the x-z-plane extruded into the y-direction.

The second collimator unit comprises the junction element 6 and additionally a collimating segment 7 that is optically (and mechanically) connected to the junction element 6. FIG. 3 shows the junction element 6 and the collimating segment 7 with a groove 7a spaced a little apart. These parts could easily be shifted into another. The junction element 6 is designed such that it fits in that groove 7a of the collimating segment 7 forming a locking fit.

Figure 4:
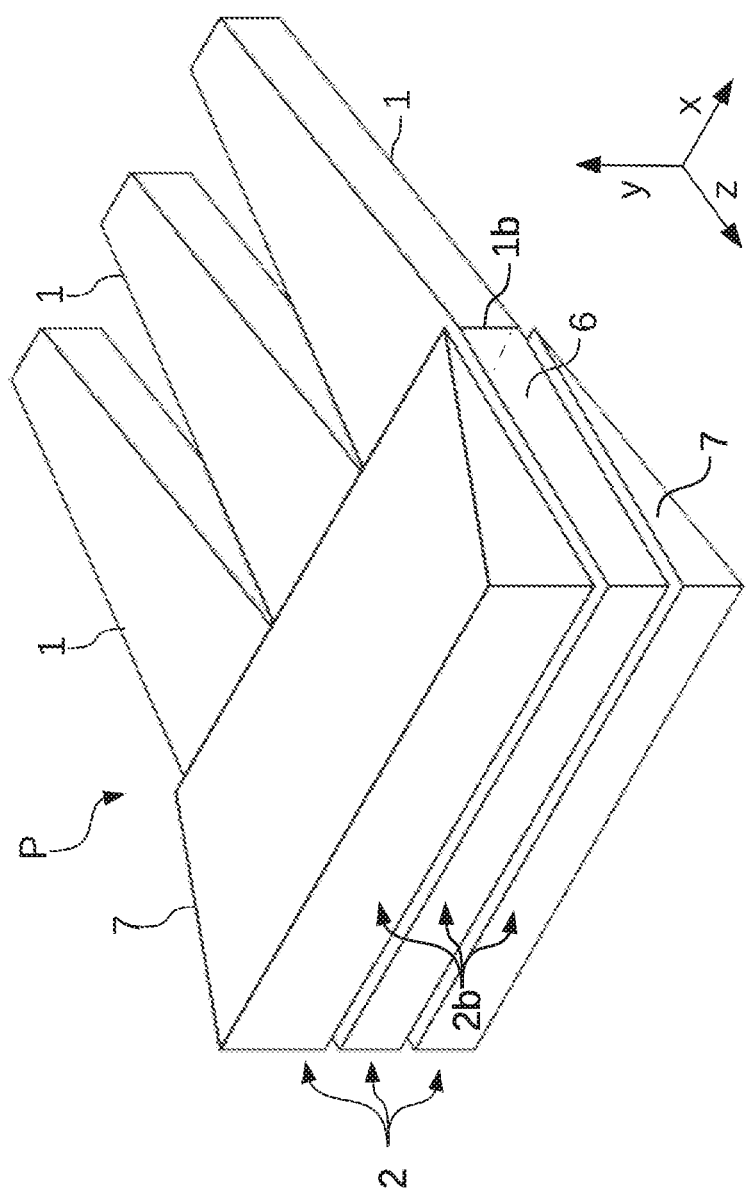
FIG. 4 shows a perspective view of another embodiment of the inventive precollimator.

FIG. 4 shows a perspective view of another embodiment of a precollimator according to the invention as an alternative to FIG. 3. Here, two collimating segments 7 are arranged over and under the junction element 6 in the second direction y. The junction element 6 ranges from the entry plane 2a of the second collimator unit 2 to its exit face 2b. The front faces of junction element 6 and the two collimating segments 7 are flush fitting and form the flat exit face 2b of the second collimator unit 2 when arranged on one another. Here, the collimating segments 7 are shaped as triangular prisms with one leg of the triangle reaching from the entry plane 2a to the exit face 2b of the second collimator unit 2.

Figures 5A, 5B:
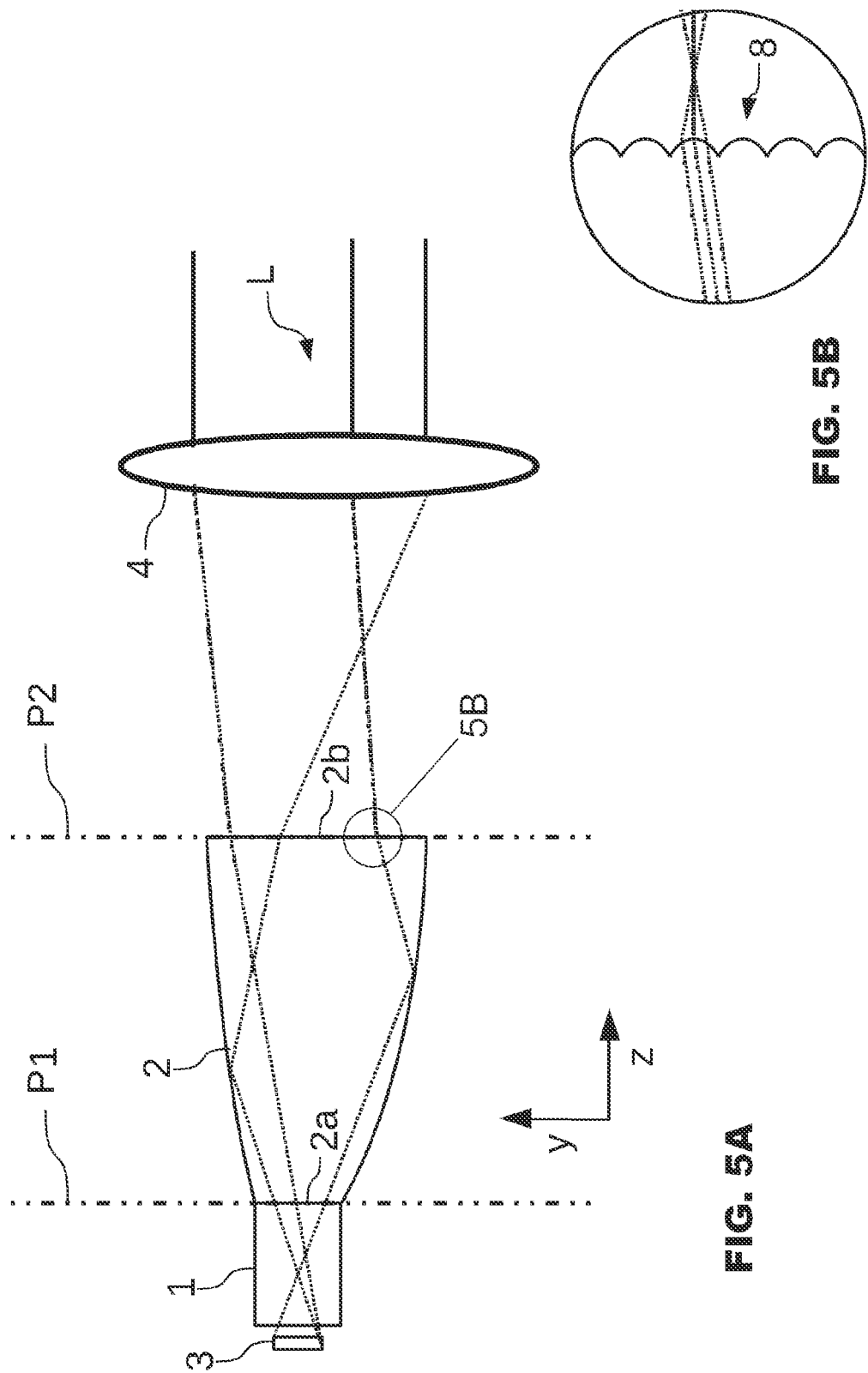
FIGS. 5A and 5B show a side view of a further embodiment of the inventive lighting device.

FIG. 5 shows a side view of a further embodiment of the inventive lighting device L. In this example, the lighting device L comprises a projection optic 4, a light source 3, and a precollimator. The setup could be similar to that shown in FIG. 1. In this figure, two focal planes P1, P2 of the projection optic 4 are shown. The projection optic is designed and arranged such that the first focal plane P1 is positioned at the entry face 2a of the second collimator unit 2 and the second focal plane P2 is positioned at the exit face 2b of the second collimator unit 2.

In this figure, three exemplary light rays are shown in the precollimator. All light rays pass the first collimator unit 1 without reflection, and two of these light rays are reflected by the second collimator unit 2.

In this example, the surface of the exit-face 2b of the second collimator unit 2 is structured with a lenticular lens array 8 that can be seen in the enlarged section below. The structure of the lenticular lens array 8 is designed such that light is spread in the dimension perpendicular to the LED row (in the y direction in the y-z-plane) indicated by the three light rays in the enlarged section.

FIG. 6 shows a perspective view of a preferred (directional) lighting device L in a headlight 9 of a car. The lighting device L comprises in this example three precollimators P that are shown from front view. Each precollimator is assigned to an individual row of LEDs (not shown, see e.g. FIG. 1) arranged at the different entry faces of the first collimating units 1 (not shown, see e.g. FIG. 1) optically joined with three second collimator units 2 arranged over one another. In front of the three rows of second collimator units 2, a projection optic 4 is arranged.

Although the present invention has been disclosed in the form of preferred embodiments and variations thereof, it is to be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module. Especially, the mention of a "unit" or a "module" does not preclude that the unit or module could be constructed from more than one piece or could comprise a part of a piece (e.g. the junction part).

REFERENCE SIGNS 1 first collimator unit
1a entry face
1b exit plane/exit face
1c side face
2 second collimator unit
2a entry plane/entry face
2b exit face
2c side face
3 light source
4 imaging optic
5a mounting structure
5b mounting structure
5c mounting structure
6 junction element
7 collimating segment
7a groove
8 lenticular lens array
9 headlight
P precollimator
L lighting device
P1, P2 focal planes
x first direction/coordinate axis
y second direction/coordinate axis
z third direction/coordinate axis

The invention claimed is:

1. A precollimator for a lighting device, comprising:
a plurality of first collimator units, each first collimator unit comprising an entry face and an exit plane,
the exit plane of each first collimator unit being wider than the entry face of the first collimator unit in a first direction,
the entry face and the exit plane of each first collimator unit having the same width in a second direction perpendicular to the first direction; and
a second collimator unit having an entry plane and an exit face, the exit face of the second collimator unit being wider than the entry plane of the second collimator unit in the second direction,
the exit plane of each first collimator unit optically connected, with no gap in-between, to the entry plane of the second collimator unit.

2. The precollimator according to claim 1, wherein the exit face and the entry plane of the second collimator unit have the same width in the first direction, wherein two opposite side faces of the second collimator unit are preferably parallel to each other and arranged perpendicular to the first direction.

3. The precollimator according to claim 1, wherein two opposite side faces of each of the first collimator units are parallel to each other and arranged perpendicular to the second direction.

4. The precollimator according to claim 1, wherein the first collimator units comprise silicone sheet or glass and are cut out of a transparent plate of material.

5. The precollimator according to claim 1, wherein the exit planes of at least two first collimator units have different dimensions, wherein the widths of these exit planes in the first direction are different.

6. The precollimator according to claim 1, wherein a surface of the exit face of the second collimator unit is provided with a texture or an optical structure, wherein this surface of the exit face comprises a lens structure, wherein the lens structure is designed to optically shift the exit face of the second collimator unit in the direction of the entry plane of the second collimator unit to the position of the entry plane of the second collimator unit.

7. The precollimator according to claim 1, wherein the first collimator units are arranged in the first direction, wherein the exit planes of two or more first collimator units are optically connected to a transparent junction element.

8. The precollimator according to claim 7, wherein the second collimator unit comprises the junction element and a collimating segment optically connected to the junction element, wherein the collimating segment
comprises a groove designed such that the junction element fits in that groove or
is arranged on the junction element in the second direction.

9. The precollimator according to claim 1, wherein the first collimator units have the shape of a geometrical extrusion body of an area extruded along the second direction, and wherein the second collimator unit has the shape of a geometrical extrusion body of an area extruded along the first direction.

10. The precollimator according to claim 1, wherein the second collimator unit and the first collimator units are made of optical glass, wherein the connection between the second collimator unit with the exit planes of the first collimator units is achieved by heat fusion.

11. The precollimator according to claim 1, wherein the second collimator unit is at least in the region of its entry plane by an additional width wider than the sum of the widths of the exit planes of the first collimator units in the first direction, wherein the additional width is designed for mounting the precollimator within the lighting device.

12. A lighting device comprising the precollimator according to claim 1, and a plurality of light sources, each light source arranged to emit light into the entry face of a corresponding one of the first collimator units.

13. The lighting device according to claim 12, comprising a projection optic designed such that it has different focal planes in the first direction and the second direction, wherein the projection optic is designed and arranged such that the focal plane in the first direction lies at the position of the entry plane of the second collimator unit and the focal plane in the second direction lies at the position of the exit face of the second collimator unit.

14. A method for producing the precollimator according to claim 1, comprising the steps:
producing or providing the plurality of first collimator units
producing or providing the second collimator unit, and
joining the plurality of first collimator units to the second collimator unit so that the exit plane of each first collimator unit is optically connected to the entry plane of the second collimator unit.

15. The method according to claim 14,
wherein each first collimator unit or the second collimator unit has the shape of a geometric extrusion body,
the first collimator units are cut from a plate, and the second collimator is produced as an extrusion element, and
the exit planes of the first collimator units are optically connected with the entry plane of the second collimator unit.

16. The method according to claim 14, wherein
the first collimator units are cut from a plate in one piece connected to a junction element,
a collimating section of the second collimator is produced as extrusion element and is optically joined with the junction element, the collimating section comprises a groove, and
the junction element is optically joined into the groove of the collimating section.

\* \* \* \* \*